Figure 1:
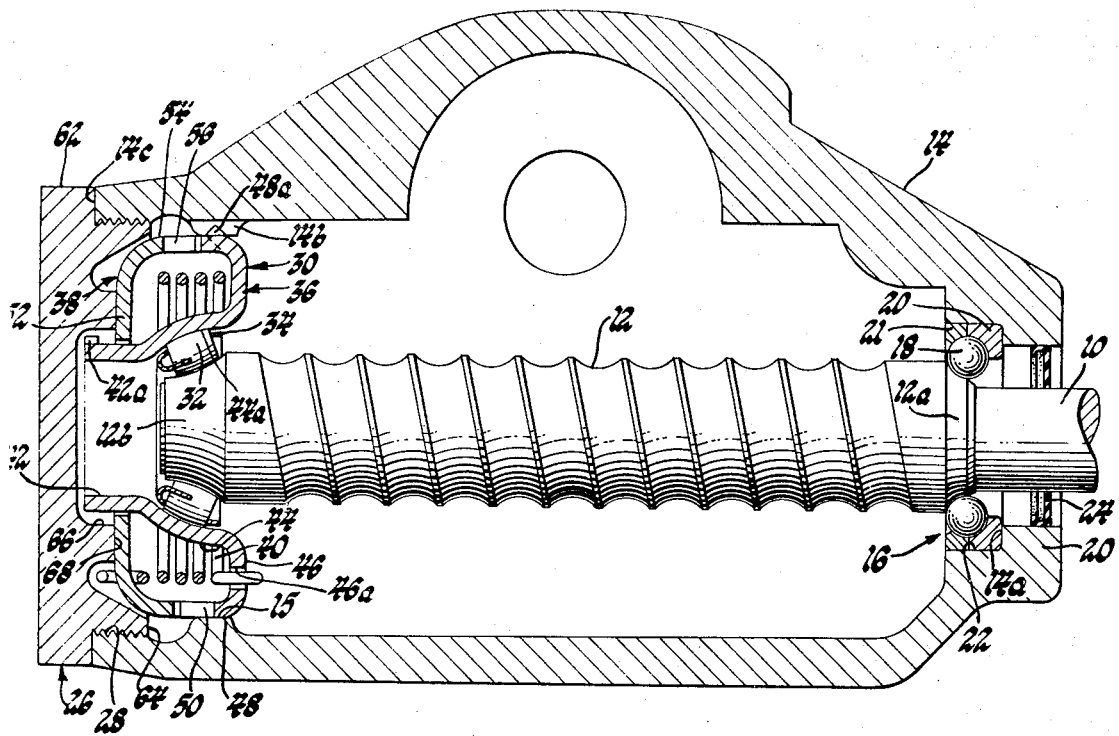

United States Patent [19]
Hay

[11] 3,762,783
[45] Oct. 2, 1973

[54] SELF-ADJUSTING TAKE-UP BEARING
[75] Inventor: Charles N. Hay, Sandusky, Ohio
[73] Assignee: General Motors Corporation, Detroit, Mich.
[22] Filed: June 15, 1972
[21] Appl. No.: 263,156

[52] U.S. Cl. .............................. 308/207, 308/189.1
[51] Int. Cl. ........................................... F16c 35/04
[58] Field of Search .................. 308/207 R, 207 A, 308/189, 189.1

[56] References Cited
UNITED STATES PATENTS
2,005,502  6/1935  Lontz ............................. 308/189 A
2,276,734  3/1942  Meredith ........................ 308/189 R Primary Examiner—Charles J. Myhre
Assistant Examiner—R. H. Lazarus
Attorney—J. L. Carpenter et al.

[57] ABSTRACT

A self-adjusting take-up bearing in which the outer race for the bearing has a cam face thereon which engages the cam face of a mating cam, cam thrust being developed by a torsion spring which forces the mating cam surfaces to rotate relative to each other in a separating direction to develop proper bearing preload.

4 Claims, 2 Drawing Figures

PATENTED OCT 2 1973 3,762,783

SELF-ADJUSTING TAKE-UP BEARING

This invention relates to a self-adjusting take-up bearing and, specifically, to a self-adjusting take-up for a steering gear worm bearing.

In various rotating mechanisms, a machine element such as a shaft is rotatably positioned within a housing by means of a pair of spaced apart bearings. Thus, for example, the worm gear in one form of a conventional vehicle manual steering gear assembly is supported by a pair of angular contact type bearings, one at each end of the steering gear housing. In this type prior art device, one of the worm gear bearings is fixed in the worm gear housing assembly while the other worm gear bearing is located in a worm bearing adjuster which is threaded into one end of this housing assembly. The adjuster is used to preload the two bearings against each other to a predetermined bearing torque, as desired, and, since it is important that both bearings be in good alignment with the worm gear, the adjuster must be accurately made and fitted to the housing assembly to preserve such alignment.

To provide for safe vehicle operation, occasional checking and readjustment of the worm bearing preload is recommended. With present manual steering gear assemblies of the above described type, this becomes a tedious job since it involves disconnecting the steering arm and then adjusting the bearing preload until a predetermined torque is required to turn the worm shaft.

It is therefore the principal object of this invention to improve a bearing assembly for use in a bearing supported rotating shaft assembly whereby the bearing relationship in this assembly is automatically adjusted to provide a predetermined bearing preload.

Another object of this invention is to provide a self-adjusting take-up bearing structure for a vehicle manual steering gear assembly to provide constant self-adjustment of the bearing preload as desired.

These and other objects of the invention are attained by means of a self-adjusting take-up bearing device rotatably supporting a shaft in a housing comprising roller elements journalled on an inner race formed on the shaft, an outer race for these roller elements having an annular cam face which mates with the cam faces on a second cam element held axially in position within a housing, a torsion spring being connected to these cam elements to effect rotation of these elements relative to each other in a separating direction to effect the desired bearing preload.

Figure 2:
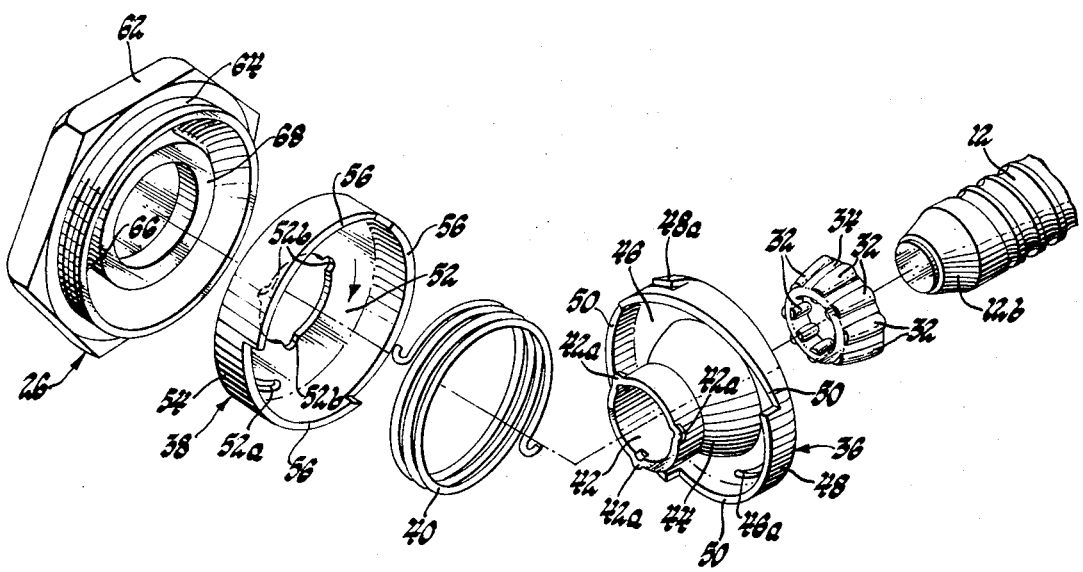

For a better understanding of the invention, as well as other objects and further features thereof, reference is had to the following detailed description of the invention to be read in connection with the accompanying drawings, wherein:

FIG. 1 is a sectional view of a portion of an automotive vehicle manual steering gear assembly incorporating a self-adjusting take-up bearing device constructed in accordance with the invention; and, FIG. 2 is an exploded axonometric view of the self-adjusting take-up bearing device of FIG. 1.

Although the self-adjusting take-up bearing device of the invention could be used with other forms of structures, it is shown in FIG. 1 as used on a vehicle manual steering gear assembly of the recirculating ball worm and nut type. In this type assembly, the worm is located on the lower end of the steering shaft and a ball nut, not shown, is mounted on the worm and has mating spiral grooves in which steel balls circulate to provide a low friction drive between the worm and the ball nut. Teeth on the ball nut engage teeth on a pitman shaft sector, not shown, whereby the pitman shaft can effect steering through a conventional vehicle steering mechanism, also not shown, since these last described elements form no part of the subject invention.

As illustrated, the steering shaft 10, having the worm portion 12 at one end thereof, is journalled in the steering gear housing 14, at its upper end, the right-hand end with reference to FIG. 1, by a conventional angular contact type ball bearing 16, an inner race 12a for this bearing being formed on the worm portion 12 for the ball elements 18. The outer race 20 and retainer 21 of bearing 16 are secured within a stepped bore 22 of the housing 14 with the outer race 20 in abutment against the housing shoulder 14a. A worm seal 24 is positioned in the upper end of the housing to encircle the steering shaft 10.

The lower end, the left-hand end as seen in FIG. 1, of the worm 12 is journalled by a self-adjusting take-up bearing, generally designated 30, of the subject invention held axially within the housing by means of a suitable retainer, such as retaining nut 26 secured in the threaded apertured end 28 of the housing. This bearing is used to take the radial and thrust loads of the steering shaft.

The self-adjusting take-up bearing 30, of the separable inner race type in the embodiment illustrated, consists of a plurality of rollers in the form of barrel rollers 32 held in spaced apart relation to each other by a separator 34, and a unit-handled cam assembly consisting of an outer race 36, a cam 38, and a coiled torsion spring 40. An inner race pathway 12b is formed on the lower or left-hand end of the worm, as shown in FIG. 1, for angular contact by the barrel rollers 32. By the use of barrel rollers, any minor misalignment of the steering shaft can be accommodated.

The outer race 36 is loosely mounted within the housing for axial movement therein and includes a tubular straight guide portion 42, a curved bearing support portion 44, the inner surface 44a of which forms the outer race pathway for the barrel rollers, a radially outward extending flange portion 46 and a return bent portion or collar 48 extending back over the curved bearing support portion and parallel to the axis of guide portion 42. The free end or left-hand face of the collar 48 is provided in the embodiment shown with three equally spaced camming ramps or cam surfaces 50 for a purpose to be described.

Cam 38, which is cup-shaped, has a radially extending apertured flange 52 slidably received over the straight guide portion 42 and an annular collar portion 54, the free end surface of which is also provided with ramps or cam surfaces 56 for cooperation with the mating ramps or cam surfaces 50 to effect and maintain axial displacement of the outer race 36 relative to the cam 38 in a manner to be described.

The coiled spring 40 is used to normally rotatively bias the cam 38 in a direction relative to the outer race 36 to cause rotational motion of the cam 38 with respect to the outer race in an up-ramp direction to cause maximum axial extention of the outer race 36 relative to the cam 38 to preload the roller bearings 32 and the bearing 16, as desired, by effecting movement of the worm together with these bearings to the right, as seen in FIG. 1, with the bearing 16 firmly seated against the shoulder 14a of the housing and with the rollers and balls of the bearings 30 and 16 in angular contact with the worm portion 12. The coiled spring 40, which is placed in tension before assembly, is mounted to encircle the curved bearing support portion 44 of outer race 36 with one end of the spring engaged in a suitable slot 46a in the outer race and the opposite end of the spring engaged in a suitable slot 52a in the cam 38 to normally bias the outer race and cam in an up-ramp or, in a clockwise direction with respect to the cam 38 as seen by the arrow in FIG. 2.

It can be seen from the foregoing, that relative rotation of the cam 38 with respect to outer race 36 in the opposite direction will result in a down-ramp movement, thus shortening the axial extension of these elements. In addition, the angle of the ramps or cam surfaces 50 and 56 are so selected that these elements will frictionally lock against any axial force applied against these elements in a direction which would otherwise shorten their axial extension relative to each other.

To provide for a unit assembly of the outer race, spring and cam assembly, the free end of the straight guide portion 42 of the outer race 36 is provided with radially outward extending tabs 42a, three such tabs being shown in the embodiment illustrated, which are slidably received through the cutouts 52b in the radial flange 52 of cam 38 whereby, as the tabs are rotated relative to the slots after assembly of these elements, the cam 38 is effectively locked onto the outer race member 36.

In this respect, the axial distance that the cam 38 can move to the left, in the assembled position as seen in FIG. 1, before its apertured flange 52 would engage the tabs 42a on the outer race 36 is such as to prevent full rise or up-camming of the cam surfaces on cam 38 and outer race 36 with respect to each other to prevent unwinding of the previously pre-tensioned coiled spring 40. By proper spacing of the tabs 42a and the notches 52b on the outer race 36 and cam 38, respectively, and by preventing full rise or up-camming of the cam surfaces as described above, the unit assembly of outer race 36, cam 38 and coiled spring 40 can be maintained.

The outer race 36, as previously mentioned, is slidably received in the inner end bored bearing support wall 15 of the housing for axial movement therein but is restrained against rotative movement relative to the housing by means of one or more radially extending tabs 48a formed by perforating the collar 48 of the outer race, each tab 48a being slidably received in a corresponding axial slot 14b provided for this purpose within the support wall 15 of the housing 14.

In the embodiment shown, the retaining nut 26 includes a suitable wrench engaging portion, such as the closed hex head 62 at one end thereof and an external threaded collar portion 64 at its other end. Formed integral with the closed hex head 62 and extending axially outward therefrom into the collar portion 64 is an annular stop collar 66 having a radial shoulder 68 at its free end for engagement with the flange portion 52 of cam 38 to retain the cam axially in one direction within the housing 14, the inside diameter of the stop collar 66 being sufficiently larger than the outer extended diameter of the tabs 42a on outer race 36 so as to loosely receive the guide portion 42 thereof as seen in FIG. 1.

In the final assembly, after assembly of the other parts of the steering gear assembly as shown, the bearing 30 is assembled to the lower end of the worm portion 12 of the steering shaft, the left-hand end as seen in FIG. 1, with the tabs 48a of the outer race slidably positioned within the slots 14b of the housing after which the retaining nut 26 is screwed in place. The design of the steering gear assembly is such that before the retaining nut 26 is seated against the outer seating surface 14c of the housing, the radial shoulder 68 of the retaining nut contacts the flange portion 52 of the cam 38 somewhere within the tolerance build-up range of the steering shaft, bearings and housing assembly. When this occurs, the frictional force between the retaining nut and the cam is such that further rotation of the retaining nut causes relative rotation of the cam 38 therewith allowing down-ramp movement of the cam relative to the outer race to effect axial shortening of these elements until the retaining nut is seated against the housing.

Thus, when threading the retaining nut 26 into the housing 14, the retaining nut will engage the cam 38 moving it and the remainder of the bearing 30 axially to the right as seen in FIG. 1 taking up stack-up tolerances of the steering shaft, bearings and housing assembly. When these stack-up tolerances have been eliminated so that the outer race 36 is axially positioned fully to the right, with reference to FIG. 1, that is, to the position shown, the frictional force between the cam 38 and the shoulder 68 of retaining nut 26 will cause the cam 38 to rotate therewith and relative to the outer race 36 allowing down-ramp movement between the outer race 36 and cam 38. That is, the ramp surfaces 50 and 56 slip with respect to each other, thus allowing the cam 38 to rotate relative to the outer race in a down-ramp direction thus decreasing the axial dimension across these elements until the retaining nut is seated against the housing with the coiled spring 40 maintaining the desired preload on the bearings.

What is claimed is:

1. In a machine assembly including a housing, a shaft extending longitudinally in said housing, a first bearing means and a self-adjusting bearing assembly rotatably supporting said shaft in said housing, said self-adjusting bearing assembly comprising angular contact roller means rotatably journalled on said shaft, an outer race for said roller means having a tubular guide portion, a curved bearing support portion, the inner surface of which provides an outer race pathway for said roller means, and a radial flange portion terminating in a return bent portion forming a cam faced collar extending back over said curved bearing support portion, said outer race being slidably supported and mounted against rotation in said housing in engagement with said roller elements on said shaft, a cam means slidably received on the tubular guide portion of said outer race, said cam means having cam surfaces adapted to cooperate with said cam faced collar of said outer race, spring means encircling said bearing support portion of said outer race with one end of said spring engaging said outer race and the opposite end of said outer race engaging said cam means to normally rotatably bias said outer race relative to said cam means in an up-cam direction and, a retaining nut threaded to said housing in abutment against said cam means for securing the self-adjusting bearing assembly axially in one direction in said housing.

2. In a machine assembly according to claim 1 wherein said cam means is cup-shaped and includes an apertured radial flange encircling said tubular guide portion of said outer race and a cam faced collar extending axially therefrom forming said cam surfaces, and wherein said tubular guide portion has radial outward extending tabs at its free end engagable with said apertured radial flange to limit axial separation of said cam means relative to said outer race.

3. In a machine assembly including a housing, a shaft extending longitudinally in said housing, a self-adjusting bearing rotatably supporting one end of said shaft in said housing, said bearing including angular contact roller means rotatably engaging said shaft, an outer race having a tubular guide portion, a bearing support portion, the inner surface of which provides an outer race pathway in engagement with said roller means and a radial flange portion terminating in a return bent portion forming a cam faced collar extending back over said bearing support portion and having axial extending tabs thereon, said housing having a slotted bored bearing support means to slidably receive said cam faced collar and said tabs thereon of said outer race, an apertured cup-shaped cam slidably mounted on said outer race and having a cam surface adapted to cooperate with said cam faced collar for adjusting said outer race axially within said housing when said cup-shaped cam is rotated relative to said outer race, said cup-shaped cam being positioned in said housing to prevent axial movement thereof in one direction relative to said housing and, spring means connected to said cup-shaped cam and to said outer race to normally rotatively bias said cup-shaped cam relative to said outer race in an axial separating direction.

4. A self adjusting bearing of the separable inner race type for use to rotatably support one end of a shaft in a housing comprising roller means adapted to cooperate on an inner race pathway on the shaft, an outer race for said roller means having tubular means slidably mountable over the shaft for engagement with said roller means, said outer race further having a collar portion with cam surfaces on one face thereof, a cup-shaped cam slidably received over a portion of said tubular means of said outer race and having cam surfaces thereon to mate with the cam surfaces of said outer race for adjusting the axial position of said outer race relative to said cam, said cam being adapted to be positioned within the housing to prevent axial movement of said cam relative to the housing, means on said outer race positioned to cooperate with the housing for preventing rotational movement of said outer race relative to the housing while permitting axial movement relative to the housing, and spring means operatively connected to said outer race and to said cam to rotatably bias said cam relative to said outer race to extend the axial spacing of said cam relative to said outer race.

* * * * *